UNITED STATES PATENT OFFICE.

ALBERT HERRMANN, OF HOCHST-ON-THE-MAIN, GERMANY, ASSIGNOR TO THE FARBWERKE, VORMALS MEISTER, LUCIUS & BRÜNING, OF SAME PLACE.

BLUE-GREEN DYE.

SPECIFICATION forming part of Reissued Letters Patent No. 11,116, dated October 14, 1890.

Original No. 422,018, dated February 25, 1890. Application for reissue filed September 15, 1890. Serial No. 364,912.

*To all whom it may concern:*

Be it known that I, ALBERT HERRMANN, doctor of philosophy, a citizen of the Empire of Germany, residing at Höchst-on-the-Main, in the Empire of Germany, have invented certain new and useful Improvements in Green-Blue Coloring-Matter; and I do hereby declare the following to be a full, clear, and exact description of the invention, such as will enable others skilled in the art to which it belongs to make and use the same.

In the manufacture of the coloring-matters described in Patents Nos. 412,613, 412,614, and 412,615, I have discovered still another coloring-matter, a derivative of the metaoxydiamidotriphenylmethan,

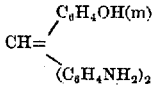

viz., the metaoxytetralkyldiamidotriphenylmethan of unsymmetric constitution. Two different tertiary aromatic bases are condensed with metanitrobenzaldehyde. The leuco base of this coloring-matter is produced by condensing metanitrobenzaldehyde with tertiary aromatic amines, (Berichte der Deutschen chemichen Gesellschaft 12, 802,) the leuco base reduced into the corresponding metaamido leuco base. This latter base, in cold diluted acid solution, is treated with a nitrite (one molecule) and the replacement of the amide by the hydroxyl caused to take place by boiling until the development of nitrogen ceases. In this manner I prepare metaoxytrimethylbenzyldiamidotriphenylmethan, metaoxytriaethylbenzyldiamidotriphenylmethan, metaoxydimethylaethylbenzyldiamidotriphenylmethan, metaoxydiaethylmethylbenzyldiamidotriphenylmethan, metaoxyethylmethylbenzyldiamidotriphenylmethan,

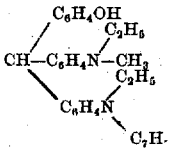

metaoxyethylmethylmethylbenzyldiamidotriphenylmethan,

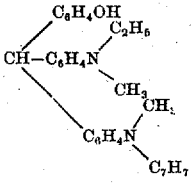

metaoxymethylbenzylethylbenzyldiamidotriphenylmethan,

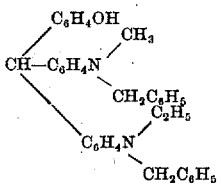

metaoxydiethyldibenzyldiamidotriphenylmethan, non-symmetric,

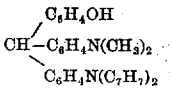

metaoxydiethyldibenzyldiamidotriphenylmethan, non-symmetric; metaoxymethylethyldibenzyldiamidotriphenylmethan, non-symmetric. The same base may be obtained also by treating one part, by molecular weight, of metaoxybenzaldehyde with one part, by molecular weight, each of dimethylaniline, and one part, by molecular weight, of methylbenzylaniline; diethylaniline and one part, by molecular weight, of ethylbenzylaniline; dimethylaniline and one part, by molecular weight, of ethylbenzylaniline; diethylaniline and one part, by molecular weight, of methylbenzylaniline; methylbenzylaniline and one part, by molecular weight, of ethylbenzylaniline; ethylmethylaniline and one part, by molecular weight, of methylbenzylaniline; methylethylaniline and one part, by molecular weight, of ethylbenzylaniline; dimethylaniline and one part, by molecular weight, of dibenzylaniline; diethylaniline and one part, by molecular weight, of dibenzylaniline; ethylmethylaniline and one part, by molecular weight, of dibenzylaniline, in the presence of condensing agents—such as sulphuric acid chlorzinc—and in manner as described more fully in the other applications aforesaid. This metaoxyleuco base is converted into the sulphonic acid by treatment with sulphuric acid, or, preferably, fuming sulphuric acid and this acid oxidated to coloring-matter.

The new coloring-matter is in the form of a copper-red powder having metallic luster, soluble in water and alcohol. It dissolves readily in water with a blue tint and dyes wool and silk in an acid bath quite even green-blue shades prominent by great fastness.

What I claim as new, and desire to secure by Letters Patent, is—

The new coloring-matter described, of unsymmetric constitution, derived from metaoxytetralkyldiamidotriphenylmethan, the article being a copper-red powder of metallic luster, dyeing a bluish-green, and soluble in water and alcohol, substantially as set forth.

In testimony whereof I affix my signature in presence of two witnesses.

ALBERT HERRMANN.

Witnesses:
JOSEF REVERDY,
HEINRICH HAHN.